(No Model.)
P. K. HUGHES.
AXLE AND AXLE BOX.
No. 249,728. Patented Nov. 15, 1881.
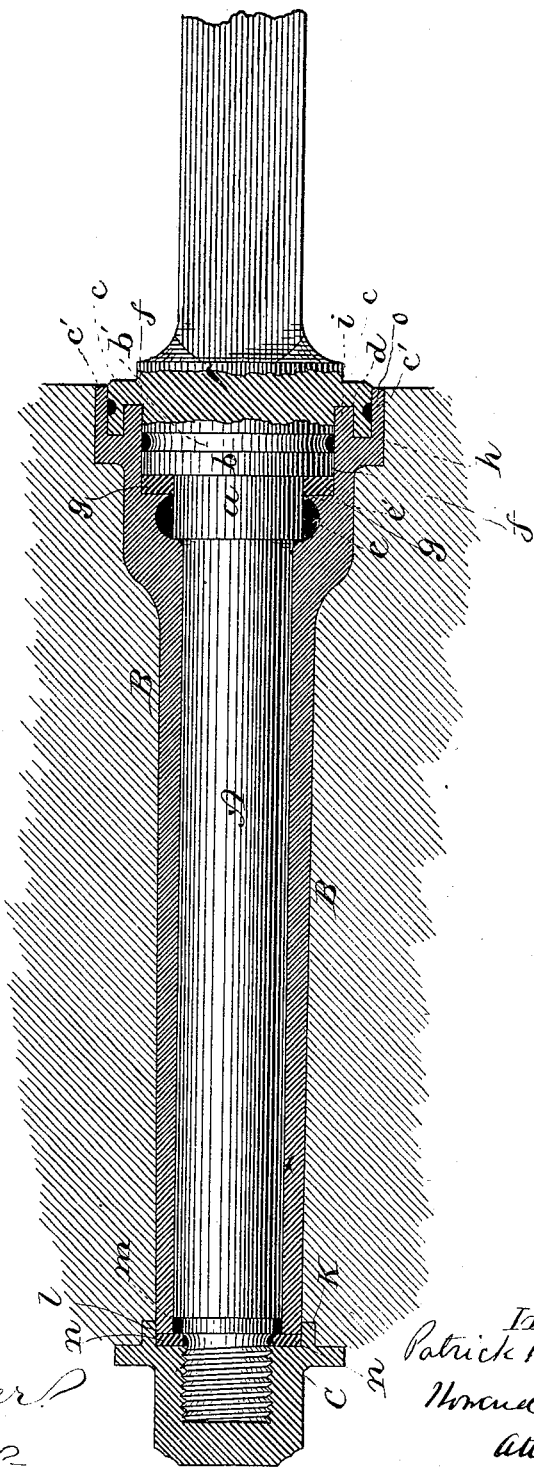
Witnesses:
J. W. Garner
N. S. D. Haines
Inventor:
Patrick K. Hughes
Howard A. Snow,
Attorney.

UNITED STATES PATENT OFFICE.

PATRICK K. HUGHES, OF AUBURN, NEW YORK.

AXLE AND AXLE-BOX.

SPECIFICATION forming part of Letters Patent No. 249,728, dated November 15, 1881.

Application filed August 29, 1881. (No model.)

*To all whom it may concern:*

Be it known that I, PATRICK K. HUGHES, a citizen of the United States of America, residing at Auburn, in the county of Cayuga and State of New York, have invented certain new and useful Improvements in Carriage Axles and Boxes; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention consists of an improved axle arm and box, the construction of which will be hereinafter fully set forth.

The accompanying drawing fully illustrates my invention.

A is the axle-arm, inclosed by the axle-box B. Upon its outer end is formed the usual thread, onto which screws the nut C, as shown. The inner end of the axle-arm is constructed with a shoulder, $b$, placed immediately in front of the axle-collar, and provided with an annular groove, $b'$, and a flanged collar, $c$, having cut in its circumference the groove $c'$, as shown. A groove, $d$, is formed between the flange and shoulder $b$, in which operates the shoulder $i$ of the axle-box.

The axle-box B has its inner end enlarged. It has an annular recess, $e$, shoulder $e'$, and an elongated groove, $f$, in which is inclosed the washer $g$ and the shoulder $b$. It is also provided with a groove, $h$, and annular casing $o$, in which are inclosed the shoulder $c$ and an annular shoulder, $i$, which fits snugly into the groove $d$, as shown.

I am aware that the construction of a flanged collar upon an axle-arm and an axle-box provided with a corresponding groove is old; but by the construction of an additional shoulder and of an axle-box provided with corresponding additional grooves and shoulders I secure greater protection from sand, as will be readily seen by the arrangement of the recess $f$, shoulder $i$, and casing $o$ of the axle-box, operating snugly around the shoulders $b$ and $c$.

The axle-box is made longer than the axle, and its outer end projects beyond it, as shown. The nut C is provided on its inner side with an annular shoulder, $k$, and groove $l$. When the nut is in position upon the axle the end of the axle-box enters the groove $l$, and the shoulder $k$ fits snugly upon the outside of the box, thus providing a protection against the entrance of sand from the outside.

$m$ is a recess formed between the projecting end of the axle-box and the screw end of the axle, and serves as a receptacle for sand which may work into the end of the axle.

$n$ is a washer, placed between the face of the nut and the outer end of the axle-box.

What I claim is—

The combination of an axle-arm constructed with an annular-grooved shoulder, $b$, and having formed upon its collar the flanged and grooved shoulder $c$, with an axle-box constructed with an annular groove $e$, recess $f$, shoulder $i$, groove $h$, and casing $o$, arranged to fit snugly around the axle-arm, substantially as shown.

In testimony whereof I affix my signature in presence of two witnesses.

PATRICK K. HUGHES.

Witnesses:
S. J. WESTFALL,
CHAS. G. ADAMS.